May 19, 1964  S. LESZCZYNSKI  3,133,570
COMMINUTER FOR VEGETABLES
Filed April 5, 1962  2 Sheets-Sheet 1

Stanley Leszczynski
INVENTOR.

BY Karl F. Ross

AGENT.

May 19, 1964  S. LESZCZYNSKI  3,133,570
COMMINUTER FOR VEGETABLES
Filed April 5, 1962  2 Sheets-Sheet 2
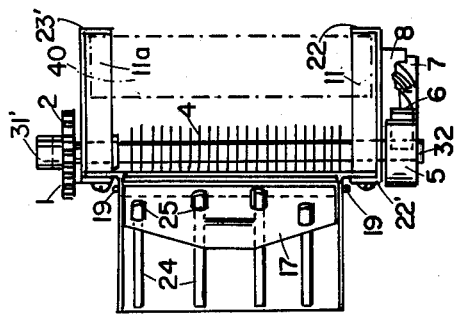
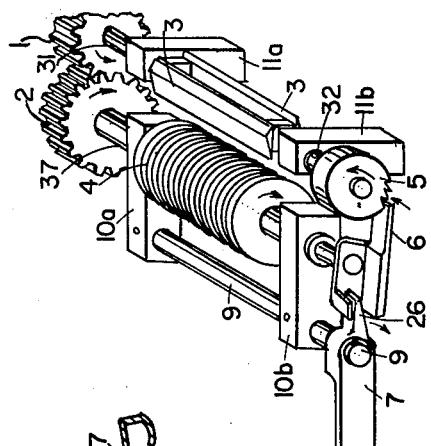
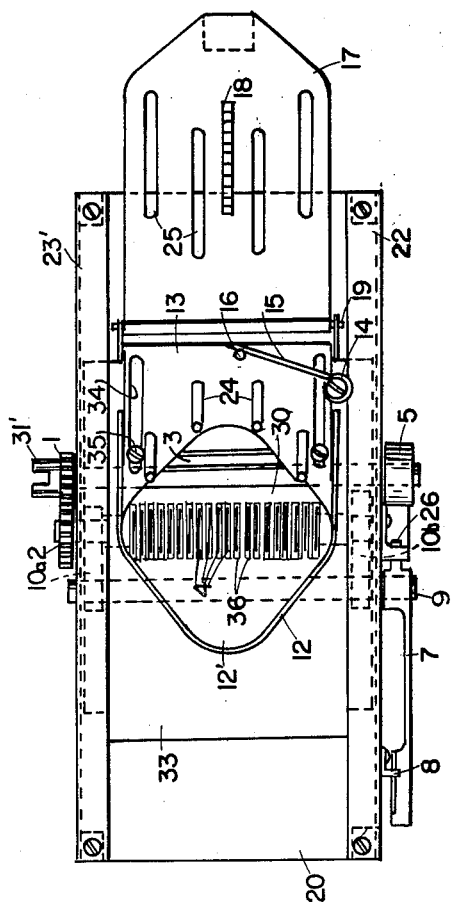
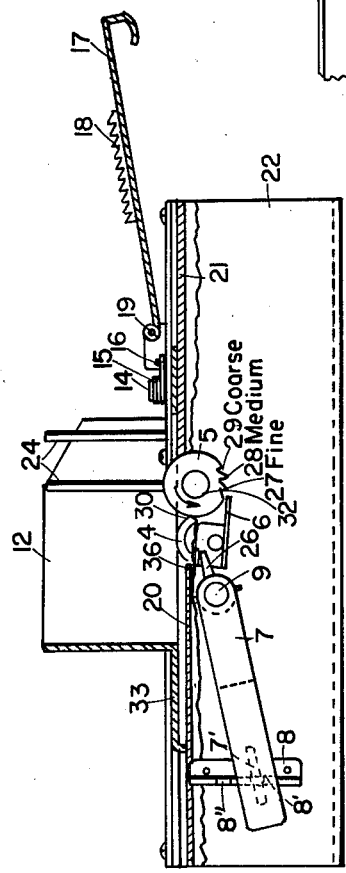
Stanley Leszczynski
INVENTOR.
BY  Karl F. Ross
AGENT.

United States Patent Office 3,133,570
Patented May 19, 1964

3,133,570
COMMINUTER FOR VEGETABLES
Stanley Leszczynski, 222 E. 35th St., New York 16, N.Y.
Filed Apr. 5, 1962, Ser. No. 185,405
8 Claims. (Cl. 146—78)

My present invention relates to a device for comminuting vegetables (including fruit) of various kinds.

An object of this invention is to provide a comminuting device adapted to mince or to shred a large variety of vegetables without waste or loss of juices.

Another object of my invention is to provide convenient means in such device for switching from mincing to slicing or vice versa.

A further object is to provide means for adjusting the thickness of the slices cut from the vegetable during a shredding operation.

A more particular object of the invention is to provide a comminuter having means for maintaining the vegetable substantially completely enclosed during mincing or slicing whereby pungent odors (e.g. in the case of onions) will be prevented from irritating the operator.

It is also an object of the instant invention to provide a device of this type which can be easily handled, is capable of automatic or semiautomatic operation at least for one type of comminution (e.g. mincing), is not susceptible to clogging or jamming, and can be readily cleaned and washed.

In accordance with a feature of my present invention I provide, on a stationary frame, a reciprocable carriage with a holder for the vegetable to be comminuted, the frame including two preferably horizontal, relatively offset and spaced-apart supporting plates, generally an upper and a lower one, between which there is a gap occupied by one or more elongated cutting blades; these blades extend parallel to the supporting plates and can be selectively locked at different elevations above the lower plate whereby slices of different thickness can be cut from a vegetable reciprocated with the carriage across the gap and urged under pressure against the plates. For the exertion of this (usually downward) pressure I prefer to construct the holder as a generally U-shaped bracket forming a compartment open in one direction of reciprocation and also in a direction toward and away from the supporting plates (i.e. downward and upward), in combination with a hinged tongue adapted to be swung into position between the arms of the U and to bear upon the vegetable held therein while substantially closing the open sides of the holder compartment. Advantageously, one or more upstanding retaining pins or the like may be positioned on the carriage at the open side of the bracket and may be resiliently displaced thereon to hold the vegetable in place; the tongue may then be formed with a corresponding number of slots accommodating these pins when the holder is closed.

Another feature of my invention resides in the provision of a second cutter assembly with an array of circular knives rotatable about a shaft which is parallel to the elongated cutting blades and, therefore, also to the supporting plates. The lower one of these plates, i.e. the one more remote from the plane of reciprocation of the holder outlet, is formed with slots to accommodate the circular knives whose top portions project through them into the holder compartment while being rotated, preferably automatically, in unison with the elongated blades whereby the vegetable is minced, layer for layer, as it moves back and forth across the cutters. At the same time the hand of the operator is protected from contact with the cutting blades by the intervening tongue.

The invention, according to a further feature, also includes locking means for immobilizing the elongated blade or blades in a selected shredding position, as noted above, so coupled with a movable mounting for the circular blades that the latter are withdrawn from the slotted plate, and therefore from contact with the vegetable clamped in the holder, upon a movement of the locking means into operative engagement with the shredding-blade assembly. With the rotary drive cut off or disconnected, the carriage can then be reciprocated for the horizontal slicing of successive layers without vertical longitudinal cutting, i.e. without mincing.

Directional terms such as "upper," "lower," "horizontal" and "vertical," while applicable to the preferred mode of disposing the device more particularly described hereinafter, will be employed in the appended claims solely for purposes of identification of the relative positions of the parts and not as a limitation upon their absolute locations in space.

The invention will be described in greater detail with reference to the accompanying drawing in which:

FIG. 3 is a top plan view of the device shown in FIGS. 1 and 2;

FIG. 4 is an end view of the device as seen from the right in FIG. 3;

FIG. 5 is an elevational view (partly in section) of the device seen from the same side as in FIG. 2; and FIG. 6 is an axonometric detail view of the cutting units forming part of the device of FIGS. 1–5.

Figure 1:
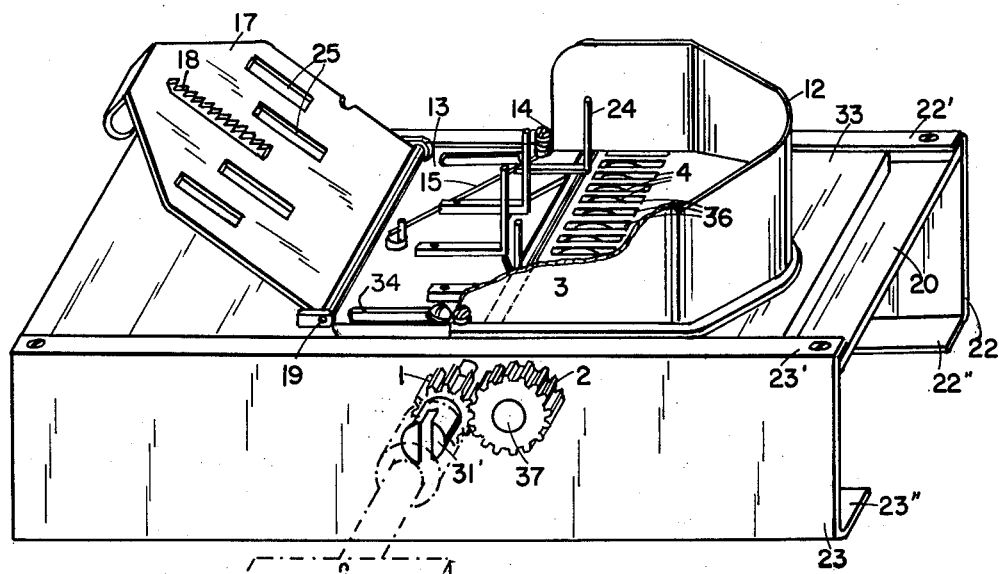
FIG. 1 is an axonometric view of a comminuting device representing a preferred embodiment.
Figure 2:
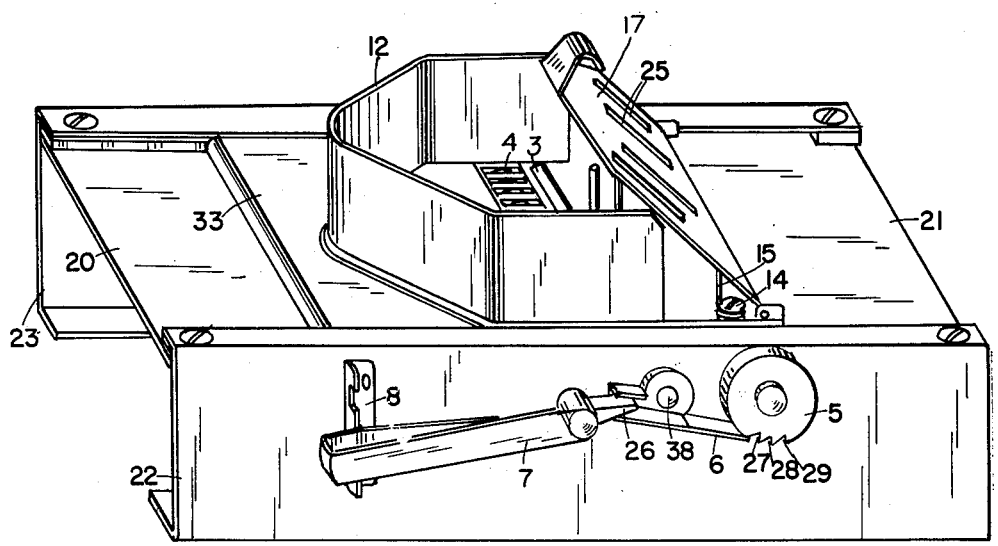
FIG. 2 is an axonometric view of the same device taken from the opposite side.

The comminuting device shown in the drawing comprises a frame composed of two side walls 22, 23 spanned near their upper edges by a lower horizontal plate 20 and an upper horizontal plate 21. Plates 20 and 21, besides being vertically offset from each other, are also horizontally separated by a gap 30 within which there are disposed, close to the edge of plate 21, a pair of elongated cutting blades 3 extending on opposite sides of their common horizontal axis of rotation which is defined by two aligned stud shafts 31, 32. Stud shaft 31, supporting a driving gear 1, is journaled in a bearing post 11a secured to side wall 23 whereas stud shaft 32, carrying a ratchet wheel 5, is similarly journaled in a bearing post 11b on side wall 22. Thus, the two posts 11a, 11b together with the frame of the device form a stationary supporting yoke for the blades 3 of which the upper one, when horizontally positioned as shown in FIG. 6, lies substantially in the plane of plate 21.

Side walls 22, 23 have upper ledges 22', 23' which spacedly overlie the plates 20, 21 to form therewith a pair of laterally extending guide rails for a carriage comprising a base plate 33 and a U-shaped bracket 12 rigid therewith. Bracket 12 forms a compartment 12' which is open upwardly and downwardly, i.e. toward the plates 20, 21, as well as forwardly, i.e. in the direction of carriage motion from plate 20 to plate 21. At the mouth of bracket 12 this compartment is adjustably bounded by a set of upstanding pins 24 which rise from a plate 13 overlying the base 33; plate 13 is longitudinally displaceable on this base, by virtue of two slots 34 traversed by studs 35, and is urged rearwardly thereon by a spring finger 15 which is anchored to the base by a screw 14 and bears upon a pin 16 on plate 13. A tongue 17, hinged to base 33 by a horizontal rod 19, can be swung about this rod to enter the compartment 12' between the arms of bracket 12 so as to bear from above upon a vegetable (e.g. a peeled onion) clamped between the bracket and the spring-urged pins 24; tongue 17 has slots 25 to clear these pins and is further provided with a toothed ridge 18 adapted to bite into the vegetable therebelow for holding it firmly in place.

Plate 20 is formed with a multiplicity of parallel, longitudinally extending slots 36 accommodating a set of rotary knives 4 on a common horizontal shaft 37 which carries a driven gear 2 in mesh with driving gear 1. Shaft 37 is journaled in arms 10a, 10b which, together with a rod 9, form a yoke swingable about that rod under the control of a lever 7 rigid with an extremity of the rod projecting from side wall 22. A bracket 8 on that side wall has notches 8', 8" for selectively receiving a rib 7' of the somewhat resilient lever 7 which may thus be indexed in either of two positions respectively shown in FIGS. 5 and 6. In the position of FIG. 5, designed for mincing, the extremities of yoke arms 10a, 10b are elevated so that the knives 4 project upwardly through slots 36 above the plate 20; at the same time a tip 26 on lever 7 holds a pawl 6, swingable about a stud 38, disengaged from any of the three peripheral teeth 27, 28, 29 of ratchet 5. The cutters 3, 4 are then free to rotate about their respective axes, e.g. upon being driven by a motor 39 coupled with a slotted extremity 31' of stud shaft 31 as illustrated diagrammatically in FIG. 1.

When it is desired to slice rather than mince, motor 31 is stopped or detached whereupon the lever 7 can be swung clockwise into its alternate position to withdraw the knives 4 below the surface of plate 20; at the same time the pawl 6 is positively rotated counterclockwise by the tip 26 to engage one of the three ratchet teeth 27–29 selectively aligned therewith. The selection of these teeth depends upon the desired thickness of the slices to be cut from the vegetable in holder 12; tooth 27, for example, corresponds to a maximum inclination of the cutting edge of upper blade 3 toward the supporting plate 20, i.e. a minimum clearance between this cutting edge and the plate surface resulting in thin slices, whereas teeth 28 and 29 progressively elevate this edge above the plate and thus produce correspondingly thicker slices.

The carriage 33, 12 is manually reciprocated, in either position of lever 7, while downward pressure is exerted upon tongue 17 to force the captive veteagble toward the supporting plates 20, 21 as the cuttings are discharged between the blades 3 and underneath plate 21 into a receptacle 40 (dot-dash lines, FIG. 4) removably positioned between the side walls 22, 23 and slidable along the lower ledges 22", 23" thereof. When the tongue 17 has been lowered to substantially the level of plate 21, the final layer of the vegetable is within reach of the cutters so that its last remnants can be usefully comminuted.

I have found that the device described readily minces or slices onions as well as other vegetables and fruits, that no unpleasant odors escape during this process, that no juice is lost and that the operation is clean and speedy. Washing under running water is effective and simple, requiring no prior disassembly of parts. The average mincing operation, with a fractional-horse-power motor, can be completed in considerably less than a minute.

While I have described and illustrated a preferred embodiment, I wish it to be understood that modifications of the specific arrangement disclosed are contemplated and, insofar as they will be readily apparent to persons skilled in the art, are intended to be embraced in the spirit and scope of my invention as defined in the appended claims.

I claim:

1. A comminuting device for vegetables, comprising a support with two longitudinally spaced horizontal plates forming a gap therebetween, said plates being disposed at different levels, elongated blade means rotatably journaled on said support and extending horizontally in said gap at substantially the level of the upper one of said plates, a carriage reciprocable above said plates across said gap, said carriage being provided with a holder for a vegetable to be shredded by said blade means, the lower one of said plates being provided with a multiplicity of parallel slots adjacent said gap extending in the direction of reciprocation, an array of rotary knives aligned with said slots and projecting upwardly therethrough, and drive means for rotating said knives and said blade means in unison about parallel horizontal axes.

2. A device according to claim 1 wherein said holder comprises a generally U-shaped bracket forming a compartment which is open downwardly, upwardly and on one side in one direction of carriage reciprocation, and a tongue hinged to said carriage at the open side of said bracket for swinging movement into said compartment from above.

3. A device according to claim 2 wherein said carriage comprises at least one clamping element at said open side and spring means urging said element toward said bracket for engagement with a vegetable therein.

4. A device according to claim 3 wherein said element is an upstanding pin, said tongue being provided with a slot accommodating said pin.

5. A comminuting device for vegetables, comprising a support with two longitudinally spaced horizontal plates forming a gap therebetween, said plates being disposed at different levels, elongated blade means rotatably journaled on said support and extending horizontally in said gap at substantially the level of the upper one of said plates, a carriage reciprocable above said plates across said gap, said carriage being provided with a holder for a vegetable to be shredded by said blade means, locking means for said blade means adapted to hold same above the lower one of said plates whereby slices can be cut from a vegetable reciprocated with said carriage past said blade means, said lower plate being provided with a multiplicity of parallel slots adjacent said gap extending in the direction of reciprocation, an array of rotary knives aligned with said slots and adapted to project upwardly therethrough, drive means for rotating said knives and said blade means in unison about parallel horizontal axes, and mechanism coupled with said locking means for withdrawing said knives below the top surface of said lower plate in an operative position of said locking means upon inactivation of said drive means and for raising said knives into an operative position projecting above said lower plate with concurrent inactivation of said locking means preparatorily to reactivation of said drive means.

6. A device according to claim 5 wherein said mechanism comprises a yoke supporting said knives, said yoke being swingable about a horizontal axis, a lever coupled with said yoke for swinging it about said axis, a toothed member coupled with said blade means, and pawl means entrainable by said lever for engaging said toothed member in a first position of said lever while being disengaged therefrom in a second position of said lever, said yoke raising said knives into said operative position upon displacement of said lever to said second position.

7. A device according to claim 6, further comprising indexing means for releasably maintaining said lever in either of its said positions.

8. A comminuting device for vegetables, comprising a support with two longitudinally spaced horizontal plates forming a gap therebetween, said plates being disposed at different levels, elongated blade means eccentrically journaled on said support for rotation about a horizontal axis parallel to said blade means, said blade means extending horizontally in said gap at substantially the level of the upper one of said plates, a carriage reciprocable above said plates across said gap, said carriage being provided with a holder for a vegetable to be shredded by said blade means, adjustable locking means for said blade means adapted to hold same in different angular positions corresponding to different elevations above the lower one of said plates whereby slices of different thicknesses can be selectively cut from a vegetable reciprocated with said carriage past said blade means, said lower plate being provided with a multiplicity of parallel slots adjacent said gap extending in the direction of reciprocation, an array of rotary knives aligned with said slots and adapted to project upwardly therethrough, drive means for rotating said knives and said blade means in unison about parallel horizontal axes, and mechanism coupled with said locking means for withdrawing said knives below the top surface of said lower plate in an operative position of said locking means upon inactivation of said drive means and for raising said knives into an operative position projecting above said lower plate with concurrent inactivation of said locking means preparatorily to reactivation of said drive means.

References Cited in the file of this patent

UNITED STATES PATENTS

| | | |
|---|---|---|
| 537,831 | Kraemer | Apr. 23, 1895 |
| 971,546 | Mayer | Oct. 4, 1910 |
| 1,287,839 | Berchtold | Dec. 17, 1918 |
| 2,801,661 | Miller | Aug. 6, 1957 |